(12) United States Patent
Hazan

(10) Patent No.: US 9,898,935 B2
(45) Date of Patent: Feb. 20, 2018

(54) LANGUAGE SYSTEM

(71) Applicant: Maurice Hazan, New York, NY (US)

(72) Inventor: Maurice Hazan, New York, NY (US)

( * ) Notice: Subject to any disclaimer, the term of this patent is extended or adjusted under 35 U.S.C. 154(b) by 515 days.

(21) Appl. No.: 14/544,311

(22) Filed: Dec. 23, 2014

(65) Prior Publication Data

US 2015/0186360 A1 Jul. 2, 2015

Related U.S. Application Data

(60) Provisional application No. 61/964,020, filed on Dec. 23, 2013.

(51) Int. Cl.
| | |
|---|---|
| *G09B 19/06* | (2006.01) |
| *G09B 19/04* | (2006.01) |
| *G09B 5/06* | (2006.01) |
| *G06F 3/0481* | (2013.01) |
| *G09B 5/02* | (2006.01) |
| *G06F 9/44* | (2018.01) |

(52) U.S. Cl.
CPC ............. *G09B 5/02* (2013.01); *G06F 9/4448* (2013.01); *G06F 3/04817* (2013.01); *G09B 5/06* (2013.01); *G09B 19/04* (2013.01); *G09B 19/06* (2013.01)

(58) Field of Classification Search
CPC .......... G09B 19/06; G09B 19/04; G09B 5/06; G06F 3/04817
See application file for complete search history.

(56) References Cited

U.S. PATENT DOCUMENTS

| | | | | |
|---|---|---|---|---|
| 5,169,342 A | * | 12/1992 | Steele | G06F 3/0481 273/454 |
| 5,210,689 A | * | 5/1993 | Baker | G06F 3/0489 341/22 |
| 6,022,222 A | * | 2/2000 | Guinan | G09B 5/065 345/473 |
| 7,401,016 B2 | * | 7/2008 | Masuichi | G06F 17/2881 704/10 |
| 7,563,099 B1 | * | 7/2009 | Iftikhar | G09B 19/04 434/156 |
| 7,689,407 B2 | * | 3/2010 | Yang | G09B 5/06 345/171 |
| 8,375,327 B2 | * | 2/2013 | Lorch | H04M 1/72555 715/810 |
| 9,204,265 B2 | * | 12/2015 | Erskine | H04W 4/12 |
| 2003/0028378 A1 | * | 2/2003 | August | G10L 13/00 704/260 |
| 2003/0085933 A1 | * | 5/2003 | Ortega | G09F 3/02 715/865 |
| 2008/0097745 A1 | * | 4/2008 | Bagnato | G06F 17/289 704/8 |
| 2009/0094016 A1 | * | 4/2009 | Mao | G06F 17/28 704/3 |
| 2010/0005065 A1 | * | 1/2010 | Lai | G06Q 10/107 707/E17.014 |
| 2012/0004902 A1 | * | 1/2012 | Sorkey | G06F 19/322 704/9 |
| 2014/0200877 A1 | * | 7/2014 | McCann | G06F 17/289 704/2 |
| 2015/0186360 A1 | * | 7/2015 | Hazan | G09B 5/02 704/8 |
| 2016/0042661 A1 | * | 2/2016 | Minkoff | G09B 19/06 434/157 |
| 2017/0004470 A1 | * | 1/2017 | Hewitt | G06Q 20/145 |

\* cited by examiner

*Primary Examiner* — Samuel G Neway

(57) ABSTRACT

A language system having an image library and a text and/or audio library for enabling a user with a user device to form words, phrases and sentences by selecting by selecting images and to provide the user with text and/or audio representations thereof in a chosen language.

20 Claims, 2 Drawing Sheets

LANGUAGE SYSTEM

CROSS REFERENCE TO RELATED APPLICATIONS

The present application claims the benefit of U.S. Provisional Patent Application Ser. No. 61/964,020, filed Dec. 23, 2013, entitled "Method and Model For Interactive Dynamic Semiotic Objects".

BACKGROUND OF THE INVENTION

Description of the Related Art

The present invention relates to the area of language systems and, in particular, systems for teaching, learning, translating, composing and communicating in different languages using images.

Learning or using a different language is a difficult task. The written (text) and verbal (audio) vary, often dramatically, from language to language, and even from dialect to dialect within some countries. However, images are universal; we all see the same thing. As such, images can serve as the basic "building blocks" for teaching, learning etc. different languages.

Images have been used to assist with the learning, teaching, etc. of language with the use of cards, textbooks, signs and the like but it is still a slow and difficult process. Thus, there is a need in the art for an image based language system that: is fast, convenient, flexible, easy to use, efficient, powerful and effective for teaching, learning, translating, composing and communicating in different languages; involves the human facilities for learning of visual, audio, reading and tactile; makes it easy to learn composition (e.g. syntax, conjugation, tense, etc.) in a language; and is easy to save lessons, compositions and other work product for future reference and/or use.

SUMMARY OF THE INVENTION

A language system for use with one or more user devices and comprising: an image library; one or more audio libraries for each language, each such audio language library being coupled to the image library when such language is chosen; and wherein the user can comprise words, phrases and/or sentences by selecting one or more images from the image library, in response to which, the language system can deliver an audio representation of such words, phrases or sentences in a chosen language.

A language system as described above wherein one or more user devices are connected remotely to the language system by a communication system.

A language system as described above wherein one or more user devices are connected to the language system to form a system.

A language system for use with one or more user devices and comprising: an image library; one or more text libraries for each language, each such text language library being coupled to the image library when such language is chosen; wherein the user can comprise words, phrases and/or sentences by selecting one or more images from the image library, in response to which, the language system can deliver a text representation of such words, phrases or sentences in a chosen language.

A language system as described above wherein one or more user devices are connected remotely to the language system by a communication system.

A language system as described above wherein one or more user devices are connected to the language system to form a system.

A language system for use with one or more user devices and comprising: an image library; one or more audio libraries for each language, each such audio language library being coupled to the image library when such language is chosen; one or more text libraries for each language, each such text language library being coupled to the image library when such language is chosen; wherein, the user can comprise words, phrases and/or sentences by selecting one or more images from the image library, in response to which, the language system can deliver an audio representation of such words, phrases or sentences in a chosen language, or a text representation of such words, phrases or sentences in a chosen language; or both text and audio representations of such words, phrases or sentences in a chosen language.

A language system as described above wherein the image library is comprised of a plurality of sub-libraries, with each sub-library comprising images for a language function.

A language system as described above wherein each image is used to represent a word or phrase and the same image may be used in one or more image sub-libraries to correspond with any different language functional uses of the word or words the image represents.

A language system as described above wherein the user can comprise words, phrases and/or sentences by selecting images from the appropriate functional image sub-libraries.

A language system as described above wherein the images of each image sub-library may optionally have a generic text representation in a chosen language for coupled to each image for display to the user.

A language system as described above wherein the images of each image sub-library may optionally have a generic audio representation in a chosen language coupled to each image for playing to the user.

A language system as described above wherein the text sub-libraries are programmed with language rules such that the correct grammatical form in a chosen language is applied to and can be displayed for any grouping of images selected by the user.

A language system as described above wherein the audio sub-libraries are programmed with language rules such that the correct grammatical form in a chosen language is applied to and can be played for any grouping of images selected by the user.

A language system as described above wherein the text for one or more selected images may be represented in a plurality of chosen languages.

A language system as described above wherein the audio for one or more selected images may be represented in a plurality of chosen languages.

A language system as described above wherein the user may elect to save any and all selections made for future reference or re-use.

A language system as described above wherein one or more user devices are connected remotely to the language system by a communication system.

A language system as described above wherein one or more user devices are coupled to the language system to form a system.

A language system as described above wherein the user devices and the language system are disposed in a single, self-contained, portable system.

DETAILED DESCRIPTION

While various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention and do not limit the scope of the invention.

Figure 1:
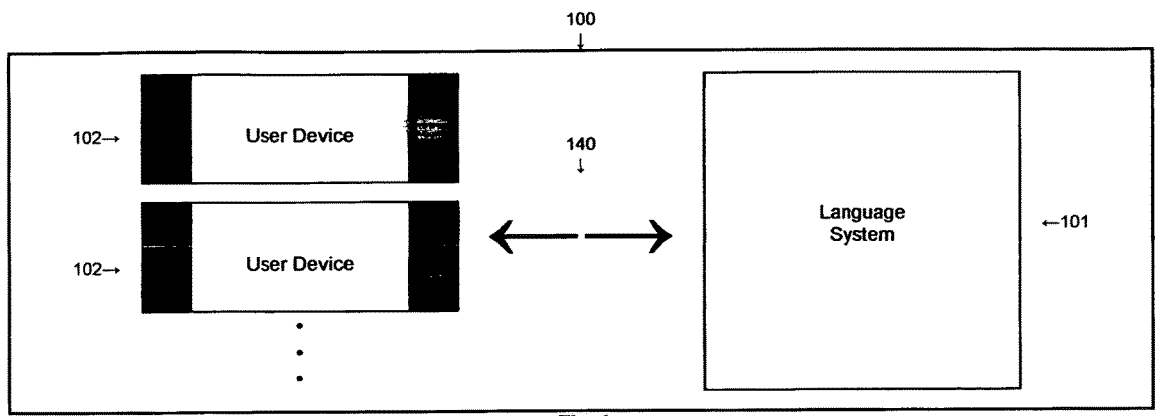
FIG. 1 is a functional diagram of the language system connected to user devices.

Referring now to FIG. 1, a broad functional diagram of the system 100 is depicted. In this embodiment of the present invention, the language system 101 is shown connected by a communication medium 140, such as the internet or other network, to one or more user devices 102. The language system 101 acts as a host for the user devices 102. The user devices 102 are remote from the language system 101 and may be remote from each other.

In the system 100, interactive communication occurs between the user devices 102 and the language system 101. The language system 101 also enables fast, independent, dynamic communication with each user device 102.

The user devices 102 may be of a wide variety of types such as a terminal, PC, laptop, tablet etc. having a display and preferably having audio capability. The language system 101 may reside in a server or data center or other suitable hosting mechanism and may also be distributed among remote hosting mechanisms.

While the embodiment of the present invention depicted in FIG. 1 has been described for a distributed or remote system 100 configuration designed to provide a language system service to a plurality of users at any location, it will be appreciated that the present invention may be embodied in a variety of configurations including, but not limited to: cloud computing; dedicated system; distributed system throughout an organization, campus or building; or self contained portable system.

Figure 2:
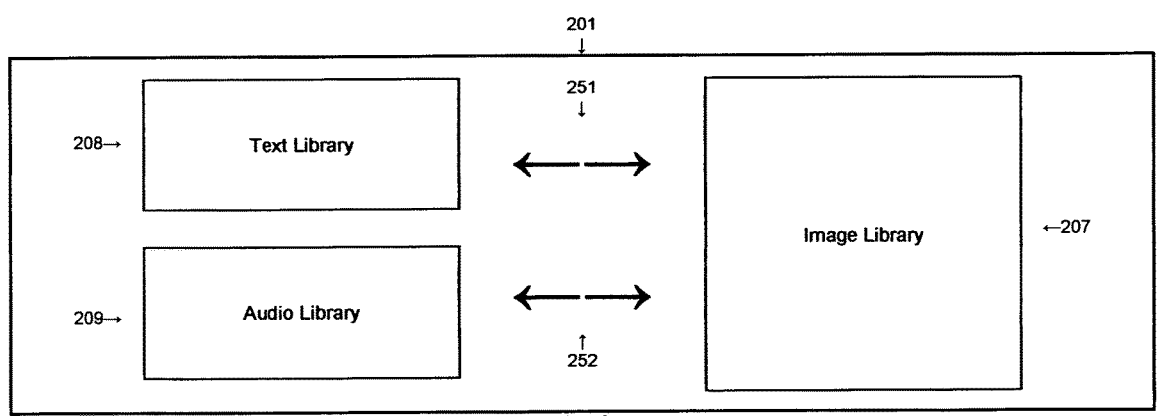
FIG. 2 is a functional diagram of the language system depicting the image, audio and text libraries.

Referring now to FIG. 2, a functional diagram of the language system 201 is depicted. The language system 201 includes an image library 207, text library 208 and an audio library 209 which are interconnected. These libraries may be resident in one location such as, for example, a server, or may be remotely situated and connected by a network or other communication medium.

Within the image library 207, constituent words of a language are assigned an image and preferably arranged in sub-libraries by usage-based groupings such as objects, adjectives, verbs, etc. The same image may then appear in different sub-libraries for different usages of the word.

The text library 208 is preferably arranged in sub-libraries by language with a text representation for the constituent words of the language such as letters or characters, for example. It is also preferable to further arrange each such language text sub-library into usage-based groupings corresponding to the usage-based groupings for that language in the image library 207.

The text library 208 is connected to the image library 207 via connection medium 251 such that when a user selects a usage based grouping in the image library 207 for a particular language, an appropriate generic text for each image in such usage based grouping is coupled to each image in the grouping and can be displayed to the user of language system. Moreover, the text library 208 is supplied or programmed with applicable files with rules for usage and grammar, such that, when the user selects images from various usage based image groupings, the text for the selected group of images will be adjusted for proper usage and grammar.

The audio library 209 is preferably arranged in sub-libraries by language with audio recordings or the like for the constituent words of the language. It is also preferable to further arrange each such language audio sub-library into usage-based groupings corresponding to the usage-based groupings for that language in the image library 207.

The audio library 208 is connected to the image library 207 via connection medium 252 such that, when a user selects a usage based grouping in the image library 207 for a particular language, an appropriate generic audio representation in the chosen language for each image in the selected usage based grouping can be enabled for the user to hear. More importantly, as will be subsequently further described, the audio library 209 can be supplied or programmed with applicable files with rules for usage and grammar, such that, when the user selects images from various usage based image groupings, the audio for the selected group of images will be adjusted for proper usage, grammar and pronunciation in the chosen language and which the user may elect to hear at any time.

While the embodiment of the present invention depicted in FIG. 2 has been described with a particular organization or arrangement and interconnection of the image library 207, text library 208 and audio library 209 it will be appreciated that the present invention may be arranged, organized, interconnected or embodied in a variety of different ways.

Figure 3:
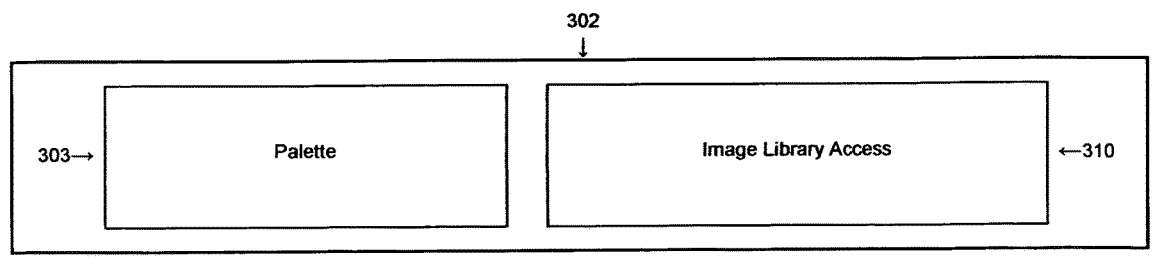
FIG. 3 is a functional depiction of a user device display when connected to the language system and depicting the palette and image library access.

Referring now to FIG. 3, a functional diagram of a user device display 302, when the user device is connected to the language system 201, is depicted. On the user device display 302, two areas appear: an image library access 310 and a palette access 303. On the image library access 310, the user can call up images from the image library 207. The palette 303 is a work space area for the user on the user device display 302. The user can select various images from the image library access 310 to insert on to the palette with which the user can form words, phrases, sentences, etc. in a selected language.

Figure 4:
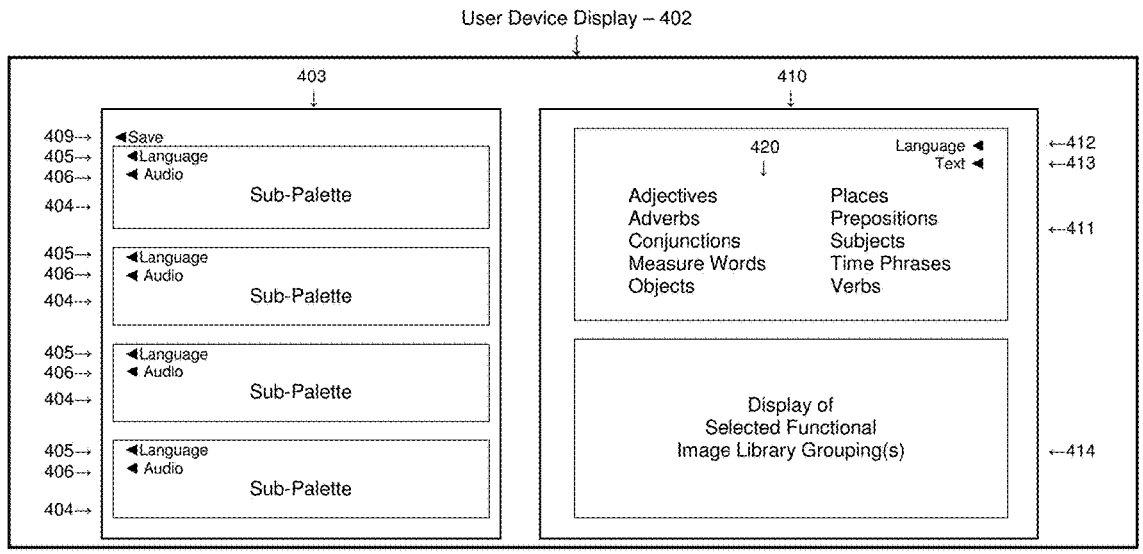
FIG. 4 is a depiction of a user device display when connected to the language system depicting components of the palette and image library.

FIG. 4 is a depiction of a user device display 402 when connected to the language system 101 and showing the image library access 410 and the palette 403 in more detail. The image library access 410 is depicted as having two display windows; a menu window 411 and an image grouping display window 414.

The menu window 411 is shown depicting to the user a plurality of usage based image groupings 420 such as "adjectives", "adverbs", through "time phrases" and "verbs." Each usage based image grouping may have sub-categories. For example, "objects" may have the sub-categories of "food" and "other objects". Also shown in the menu window 411, are two option selectors: a language option selector 412 and a text option selector 413. The language option selector 412, when engaged by the user, will provide the user with a menu of languages from which the user may choose or select one or more usage based image groupings for display in the image display window 414. A generic text for each image in the grouping selected is shown to the user in the language selected. The language system 101 may also be configured to allow the user to have the contents of menu window 411 in a different language than the (text) language for usage based image grouping(s) selected in the menu window 411. The text option selector 413 allows the user the option to hide the text for each image in a selected usage based grouping.

In the image display window 414, the images of the selected usage based image grouping(s) are retrieved from the language system 201 and displayed with or without generic text as determined by the user. One or more usage based image groupings may be displayed in the window 413. The system can also be configured to allow the user to hear a generic audio representation of any image in the image display window 414.

The palette 403 has a plurality work spaces or sub-palettes 404. The user may select, drag and drop, or otherwise populate each sub-palette with images from any of the usage based image groupings in the image display window 414 to form words, phrases, sentences, etc. Within each sub-palette 404, the user may add or subtract images, re-arrange the order of images and/or combine images. Each image disposed in a sub-palette 404 has adjustable text coupled thereto as is explained below. The system so that adjustable text in any sub-palette is hidden.

Each sub-palette 404 has two option selectors; a language selector 405 and an audio selector 406. The language selector 405, when engaged by the user, will display the menu of languages in the language system 201 allowing the user to change the language of the images disposed in any sub-palette 404. Thus, for example, the user may select images from the image display window 414 with generic text in one language, dispose them in a sub-palette 404 where the text will be converted to adjustable text in the same language and, by selecting a different language with the language selector 405, convert the adjustable text with each such image in the sub-palette 404 to such to another language.

The audio selector 406 may be engaged by the user at any time to hear an adjusted audio representation of the images in the sub-palette 404 in the language selected. The audio files in the audio library 209 include recordings for the images in the usage based groupings in the image library 207 for each language. The audio library 209 is arranged or programmed with rules for grammar, usage and pronunciation for each usage based grouping of images and can be applied to the images in any sub-palette 404. These rules take into account the arrangement and or combination of images in the sub-palette 404 as well as the presence of images from other usage based image groupings which affect such things as tense, gender etc. of an audio representation. Accordingly, when the audio selector 406 for a sub-palette 404 is engaged by the user, the language system 201 applies these rules according to the images, the usage based groupings, order of sequence, and combinations selected in sub-palette 404 so that a properly adjusted audio representation, in the language selected, can be heard for all of the images in a sub-palette 404.

Similarly, the text library 208 is arranged or programmed with rules for grammar and usage for each usage based grouping of images and are applied to the images in any sub-palette 404. These rules take into account the arrangement and/or combination of images in the sub-palette 404 as well as the presence of images from other usage based image groupings which affect such things as tense, gender etc. of a text representation. Accordingly, when an image is disposed on to a sub-palette from the image window 411, the language system 201 applies these rules according to the images, the usage based groupings, order of sequence, and combinations selected in the sub-palette 404 so that a properly adjusted text representation, in the language selected, can be displayed for all of the images in a sub-palette 404. If the language selector 405 for a sub-palette 404 is engaged and another language selected, the language system 201 changes the text coupled with the images such sub-palette is converted to adjusted text in the selected language. The system can be enabled to allow the user to hide the text in the sub-palettes.

The palette 403 also includes a save option 409, which, when engaged by the user, will save the contents on all of the sub-palettes 404 in the language system for future reference and/or work.

Figure 5:
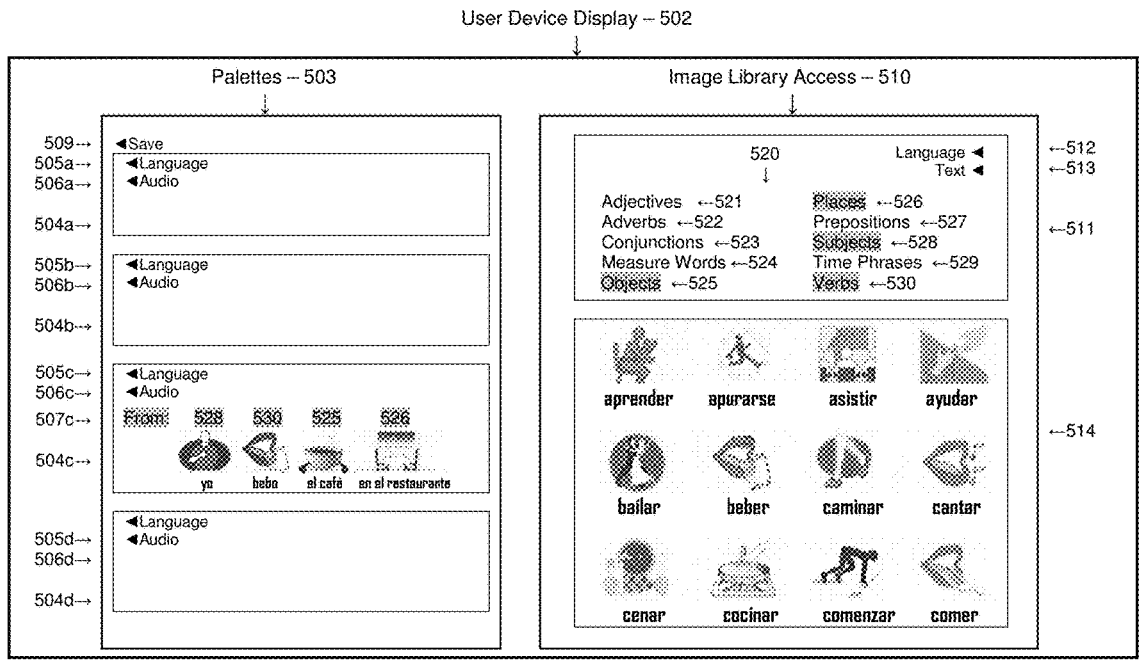
FIG. 5 is a depiction of a user device display illustrating an example of the language system in use.

Referring now to FIG. 5, an example of the system 100 being used is depicted as seen on a user device display 502. In the example, the user has selected English for usage based image groupings displayed in the menu window 511; Spanish for the text in the usage based image groupings display 514; and has not elected to hide the text displayed with images.

For display in the usage based image groupings display 514, the user has also selected the usage based image groupings of Objects 525, Places 526, Subjects 528 and Verbs 530. These selections are indicated in the menu window 511 by highlighting.

For the selections made by the user on the menu window 511 in this example, all of the images for each of the 4 usage based image groupings (Objects 525, Places 526, Subjects 528 and Verbs 530) will be displayed and accessible to the user (e.g. by scrolling) on the image display 514. In FIG. 5 however, for practical reasons, only a partial listing of the Verbs usage based image grouping 530 is shown.

Using a cursor, or a finger or whatever other similar technology is available on the user device 102, the user has selected one image from each of the 4 usage based image groupings (Objects 525, Places 526, Subjects 528 and Verbs 530) displayed on the image display 514, and placed the selected images in sub-palette 504c in the order depicted. In sub-palette 504c a pointer field 507c has been added to let the user know from which usage based image grouping the image immediately below was selected from.

The text programming files in text library 208, convert the text to the proper adjusted text representation. Specifically, for the verb selected from Verb grouping 530, the generic text appearing in the image display 514 is "beber," (or "to drink" in English). However, coupled with the image "Yo" (or "I" in English) from the Subject grouping 528, the language system 201 has selected an appropriate adjusted text version for this verb in Spanish of "bebo." If, by using the language selector 505c for this Sub-palette 504c, the language was changed to English, then the adjusted text for the group of images on sub-palette 504c would change to "I drink coffee in the restaurant.

If the user were to select the audio selector 506c for sub-palette 504c, in the audio library 209, the audio rules would be applied to the recordings and the user would hear the proper presentation for the images in sub-palette 504c in Spanish.

To further expand on the example, if the user were to go back to the menu window 511 and select the Time Phrases grouping 529, the images for that grouping would appear on the display 514. If from this grouping in the display window 514, the user selected the image for "aiya" ("yesterday" in English), and add that image to the end of the images in sub-palette 504, the adjusted text and adjusted audio would change. Since the use of a time phrase such as yesterday, denotes the "past tense," the language system's 201 text library 208 will adjust the text with the images in sub-palette 504c to "Bebi el café en el restaurante ayer" denoting the past tense of the verb when it is used with this time phrase. If the audio selector 506c for sub-palette 504c is enabled, similarly the system's audio library 209 will adjust the Spanish audio presentation to its proper representation, including the past tense.

If the user were now to copy all of the images in sub-palette 504c, to sub-palette 504b, and then with language selector 504b, change the language for this sub-palette to English, the language system's 201 text library 208 will adjust the text with the images in sub-palette 504b to "I drank the coffee in the restaurant yesterday." If the audio selector 506c for sub-palette 504b is enabled, similarly the system's audio library 209 will adjust deliver the appropriate audio presentation in English, including the past tense.

Thus, the present invention has been described herein with reference to particular embodiments for particular applications. Those having ordinary skill in the art and access to the present teachings will recognize additional modifications, applications, and embodiments within the scope thereof.

It is, therefore, intended by the appended claims to cover any and all such applications, modifications, and embodiments within the scope of the present invention.

What is claimed is:

1. A method of translating from one language selected by a user to another language selected by the user and using a processing system, the system having: an image library with a plurality of usage based image groupings wherein each image grouping has a plurality of images therein, each such image representing a word or phrase in such image grouping; and wherein each such image grouping has one or more translation text sub-libraries for each translation language the user can select; and wherein, each such translation text sub-library for an image grouping, contains a generic text for each image in the image grouping in such translation language and which is coupled to its respective image when the user selects such specific language as a 'translation from' language; and one or more user devices coupled to the processing system wherein the display screens of the user devices are configured by the processing system with: a menu window for displaying a listing of the usage based image groupings from which the user can select, an identifier symbol coupled to each such image grouping and a language selection option for the user to select a language for the listing of the image groupings displayed in the menu window; one or more display windows for the usage based image groupings selected by the user; and one or more user work windows; the method of translating comprising the steps of:
   selecting a translation language for the listing of usage based groupings displayed in the menu window and the 'translation from' language for the generic text coupled to the images in the image groupings to be displayed in the display windows;
   selecting, in the menu window, one or more usage based image groupings, the images of each such selected image grouping thereby being displayed in the display windows with the generic text for each image in the selected 'translation from' language coupled thereto;
   selecting, in the display windows, one or more images with generic text in the selected 'translation from' language coupled thereto, for placement and display in one or more of the user work windows and wherein the usage based image grouping identifier symbol for each such selected image is also coupled to such image and displayed in the user work windows;
   arranging, in one or more of the user work windows, the order of the selected usage based images; and
   selecting, in one or more user work windows, a 'translation to' language wherein the text language in such work windows is changed from the 'translation from' language to the 'translation to' language and wherein, in response to the ordering of the images and the presence of images from certain image groupings in such user work windows, the system grammatically adjusts the text to an applied 'translation to' language.

2. The method of claim 1 wherein the display windows are enabled by the processing system with an text hide option, and further including the step of:
   selecting the text hide option so that no text is displayed in the image grouping display windows.

3. The method of claim 1 wherein the menu window and the display windows are enabled by the processing system with a language option, such that the user may select different languages for the menu window and the text in the display windows.

4. The method of claim 1 wherein the image library is arranged such that for each image grouping, there are a plurality of sub-libraries wherein the images for such image grouping are coupled to the text for such images in each translation language.

5. The method of claim 1 wherein, in response to the ordering of the images and the presence of images from certain image groupings in a user work window, the processing system grammatically adjusts the text in such user work window from the generic 'translation from' language to an applied 'translation from' language.

6. The method of claim 1 wherein a user device and the processing system are disposed in a single, self-contained system.

7. A method of translating from one language selected by a user to another language selected by the user and using a processing system, the system having: an image library with a plurality of usage based image groupings wherein each image grouping has a plurality of images therein, each such image representing a word or phrase in such image grouping; and wherein each such image grouping has one or more translation text sub-libraries for each translation language the user can select; and wherein, each such translation text sub-library for an image grouping, contains a generic text for each image in the image grouping in such translation language and which is coupled to its respective image when the user selects such specific language as a 'translation from' language; and wherein each such image grouping has one or more translation audio sub-libraries for each translation language the user can select; and wherein, each such translation audio sub-library for an image grouping, contains a generic audio for each image in the image grouping in such translation language and which is coupled with its respective image when the user selects such specific language as the 'translation from' language; and one or more user devices coupled to the processing system wherein the display screens of the user devices are configured by the processing system with: a menu window for displaying a listing of the usage based image groupings from which the user can select, an identifier symbol coupled to each such image grouping and a language selection option for the user to select a language for the listing of the image groupings displayed in the menu window; one or more display windows for the usage based image groupings selected by the user; and one or more user work windows; the method of translating comprising the steps of:

selecting a translation language for the listing of usage based groupings displayed in the menu window and the 'translation from' language for the generic text and audio coupled to and with the images in the image groupings to be displayed in the display windows;

selecting, in the menu window, one or more usage based image groupings, the images of each such selected image grouping thereby being displayed in the display windows with the generic text and audio for each image in the selected 'translation from' language coupled thereto and therewith;

selecting, in the display windows, one or more images with generic text and audio in the selected 'translation from' language coupled thereto and therewith, for placement and display in one or more of the user work windows and wherein the usage based image grouping identifier symbol for each such selected image is also coupled to such image and displayed in the user work windows;

arranging, in one or more of the user work windows, the order of the selected usage based images; and selecting, in one or more user work windows, a 'translation to' language wherein the text and the audio language coupled to and with such work windows is changed from the 'translation from' language to the 'translation to' language and wherein, in response to the ordering of the images and the presence of images from certain image groupings in such user work windows, the system grammatically adjusts the text and audio to an applied 'translation to' language.

8. The method of claim 7 further including the step of:
selecting audio for one or more of the user work windows wherein the user hears the applied 'translation to' language for the images in such user work windows.

9. The method of claim 7 further including the step of:
selecting audio for one or more usage based images in one or more of the display windows wherein the user hears the generic 'translation from' language audio for such selected images.

10. The method of claim 7 wherein the display windows are enabled by the processing system with an text hide option, and further including the step of:
selecting the text hide option so that no text is displayed in the image grouping display windows.

11. The method of claim 7 wherein the menu window and the display windows are enabled by the processing system with a language option, such that the user may select different languages for the menu window and the text in and audio with the display windows.

12. The method of claim 7 wherein the text coupled to and the audio coupled with the images in the display window for any selected image grouping, is adjusted by the processing system for the grammatical function of such image grouping.

13. The method of claim 7 wherein the image library is arranged such that for each image grouping, there are a plurality of sub-libraries wherein the images for such image grouping are coupled to the text and with the audio for such images for each translation language.

14. The method of claim 7 wherein, in response to the ordering of the images and the presence of images from certain image groupings in a user work window, the processing system grammatically adjusts the text and audio in and for such user work window from the generic 'translation from' language to an applied 'translation from' language.

15. The method of claim 7 further including the step of:
saving for future reference and display all or part of the results of any of the steps taken by the user.

16. The method of claim 7 wherein a user device and the processing system are disposed in a single, self-contained system.

17. A method of translating from one language selected by a user to another language selected by the user and using a processing system, the system having: an image library with a plurality of usage based image groupings wherein each image grouping has a plurality of images therein, each such image representing a word or phrase in such image grouping; and wherein each such image grouping has one or more translation audio sub-libraries for each translation language the user can select; and wherein, each such translation audio sub-library for an image grouping, contains a generic audio for each image in the image grouping in such translation language and which is coupled with its respective image when the user selects such specific language as the 'translation from' language; and one or more user devices coupled to the processing system wherein the display screens of the user devices are configured by the processing system with: a menu window for displaying a listing of the usage based image groupings from which the user can select, an identifier symbol coupled to each such image grouping and a language selection option for the user to select a language for the listing of the image groupings displayed in the menu window; one or more display windows for the usage based image groupings selected by the user; and one or more user work windows; the method of translating comprising the steps of:

selecting a translation language for the listing of usage based groupings displayed in the menu window and the 'translation from' language for the generic audio coupled with the images in the image groupings to be displayed in the display windows;

selecting, in the menu window, one or more usage based image groupings, the images of each such selected image grouping thereby being displayed in the display windows with the generic audio for each image in the selected 'translation from' language coupled therewith;

selecting, in the display windows, one or more images with generic audio in the selected 'translation from' language coupled therewith, for placement and display in one or more of the user work windows and wherein the usage based image grouping identifier symbol for each such selected image is also coupled to such image and displayed in the user work windows;

arranging, in one or more of the user work windows, the order of the selected usage based images;

selecting, in one or more user work windows, a 'translation to' language wherein the audio language coupled with such work windows is changed from the 'translation from' language to the 'translation to' language and wherein, in response to the ordering of the images and the presence of images from certain image groupings in such user work windows, the system grammatically adjusts the audio to an applied 'translation to' language; and selecting audio for one or more of such selected user work windows wherein the user hears the applied 'translation to' language for the images in such user work windows.

18. The method of claim 17 further including the step of:
- selecting audio for one or more usage based images in one or more of the display windows wherein the user hears a generic 'translation from' language audio for such selected images.

19. The method of claim 17 wherein the image library is arranged such that for each image grouping, there are a plurality of sub-libraries wherein the images for such image grouping are coupled with the audio for such images for each translation language.

20. The method of claim 17 wherein a user device and the processing system are disposed in a single, self-contained system.

\* \* \* \* \*